Nov. 6, 1956  D. BRAUN ET AL  2,769,329
MACHINE FOR CUTTING SHEET MATERIAL
Filed Feb. 14, 1955  4 Sheets-Sheet 1

INVENTORS:
Dieter Braun, Kurt Hacker,
BY
Michael S. Striker
agt.

Nov. 6, 1956  D. BRAUN ET AL  2,769,329
MACHINE FOR CUTTING SHEET MATERIAL
Filed Feb. 14, 1955  4 Sheets-Sheet 2

INVENTORS:
Dieter Braun, Kurt Hacker,
BY
Michael S. Striker
agt.

United States Patent Office 2,769,329
Patented Nov. 6, 1956

2,769,329
MACHINE FOR CUTTING SHEET MATERIAL

Dieter Braun, Stuttgart-Heumaden, and Kurt Hacker, Stuttgart, Germany, assignors to Fortuna-Werke Spezialmaschinenfabrik A.-G., Stuttgart-Bad Cannstatt, Germany Application February 14, 1955, Serial No. 487,924

19 Claims. (Cl. 69—9.5)

The present invention relates to a machine for cutting sheet material, such as leather and the like, such machines being used, for example, in the manufacture of shoes.

In the manufacture of an article such as shoes, it is necessary to chamfer edges of the most varied curvatures on many different pieces of leather or the like, in order to place the several pieces of sheet material in a proper condition for further manufacture of a shoe, for example. At the present time, a great deal of time is consumed by workers in providing such chamfered edges because it is necessary to cut a series of differently curved edges in succession, and thus far it has been impossible for a worker to cut a series of differently shaped edges in rapid succession with a minimum of inconvenience. For example, it is possible with known machines for a worker to cut two differently shaped edges of a piece of sheet material in order to chamfer such edges, for example, without a great deal of trouble in successively changing from one edge to the other edge, but this necessitates successive cutting of a number of the same pieces. It is not possible with the known machines to cut more than two differently shaped edges without interrupting the operation for manual adjustment of the machine. Thus, where it is desired to cut parts in pairs belonging to a left and right shoe so as not to separate a pair of shoes from each other during the manufacture thereof, a great inconvenience results from the necessity of manually adjusting the machine when changing from one part of one shoe to the corresponding part of the other shoe.

One of the objects of the present invention is to overcome the above drawbacks by providing a machine which allows the operator thereof to handle only the work pieces while at the same time enabling the operator, through actuation of a foot pedal, for example, to set into motion parts which automatically adjust the machine for any desired series of successive operations.

Another object of the present invention is to provide a machine of the above type which may be manually set to cyclically carry through a series of different adjustments in predetermined succession during each cycle or to carry through the same adjustments in reverse succession.

A further object of the present invention is to provide a machine of the above type capable of automatically reversing the sequence of a series of operations.

An additional object of the present invention is to provide a machine capable of adjusting the space and angle between a sheet material guide and a cutter with the angular adjustment entirely independent of the other adjustment.

Still another object of the present invention is to provide a machine where the angle of a guide for the sheet material with respect to the cutter may be manually adjusted independently of the distance between the guide and the cutter.

Also, it is an object of the present invention to provide structure capable of accomplishing all of the above objects and made up of simple and ruggedly constructed parts which are easy to assemble and disassemble and which guarantee a long life to the machine with a minimum of repairs.

With the above objects in view, the present invention mainly consists of a cutting machine for cutting a sheet material, such as leather and the like, this machine including a support means and a cutting means carried by the support means for cutting a sheet material. A guide means is located adjacent the cutting means for guiding the material to be cut by the cutting means. A first adjusting means is operatively connected to the guide means for adjusting the distance between the same and the cutting means, and a second adjusting means is connected to the guide means for adjusting the angle thereof with respect to the cutting means independently of the first adjusting means. A moving means is operatively connected to the first and second adjusting means for actuating the same to set the guide means successively at a plurality of different elevational and angular positions with respect to the cutting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1A, 1B:
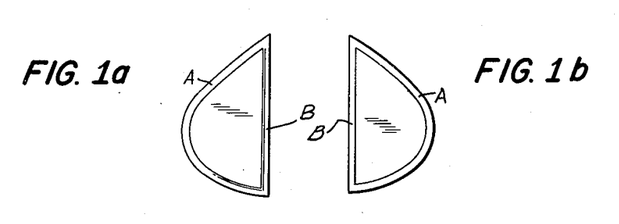
Figs. 1a and 1b respectively show diagrammatically the left and right upper toe parts of a pair of shoes.

As an example of operations which may be carried out with the machine of the invention, reference is had to Figs. 1a–3b which show the representative pieces of sheet material required to be cut during the manufacture of a conventional pair of shoes. Thus, referring to Figs. 1a–1b which respectively show the left and right upper toe portions of a pair of shoes, it is necessary to chamfer the edge of each toe portion according to a process which requires edge A to be chamfered first and then edge B. Thus, each of the members shown in Figs. 1a and 1b are chamfered in a series of steps during which the operator chamfers edges ABABAB, etc., and it is always necessary to change the adjustment after one edge is chamfered. In other words, the adjustments for chamfering an edge A is different from that for chamfering an edge B and since an edge A is always chamfered after an edge B and since an edge B is always chamfered after an edge A it is not possible to chamfer two edges in succession without changing the adjustment of the guide which guides the sheet material. The left piece shown in Fig. 1 has its chamfering started at the sharp corner shown at the upper right of Fig. 1a while the right piece of Fig. 1b has its chamfering started at the lower left relatively blunt corner shown in Fig. 1b. If chamfering is started with the right workpiece at its sharp corner, which may be desirable under certain circumstances, then the series of cuts is BABABA, etc.

The above process assumes that the operator will cut a series of members as shown in Fig. 1a one after the other and then a series of members as shown in Fig. 1b. However, it is often desirable to simultaneously manufacture a pair of shoes while retaining the shoes of each pair together throughout the manufacture thereof, and under these circumstances, the members shown in Figs. 1a and 1b would be chamfered one after the other. With such a process the edges are cut in the sequence ABBAABBAABBA, and with such an arrangement a change in adjustment is required only after every second edge is cut since after edge B of the first piece is cut, for example, then the corresponding edge B of the next piece is cut, and the same way for the edges A so that with this arrangement it is possible to leave one setting for two edges.

Figure 2A:
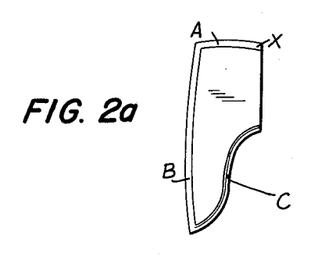
Figs. 2a and 2b respectively show diagrammatically left and right side parts of a pair of shoes.
Figure 2B:
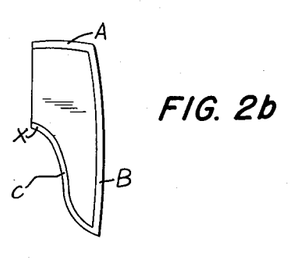

With the more complicated pieces shown in Figs. 2a and 2b, the sequence of cutting for the left piece shown in Fig. 2a is ABC, ABC, ABC, etc., and for the right piece CBACBASBA, etc., the cutting starting at the corners x shown in Figs. 2a and 2b. Thus, with this arrangement it is evident that two of the same edges are never chamfered in succession so that adjustment is required after each edge. Where the parts shown in Figs. 2a and 2b are chamfered in pairs, the chamfering still starts at the corners x, but the sequence is ABCCBAABCCBA, etc. and it will be seen that first two edges C are chamfered in succession when changing from a left to a right shoe part, for example, and then two edges A are cut in succession. Thus, with this arrangement it is necessary to make an adjustment first after one edge is cut and then after the next two edges are cut.

Figure 3A:
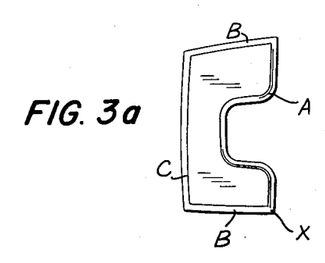
Figs. 3a and 3b respectively show diagrammatically left and right upper parts of a pair of shoes.
Figure 3B:
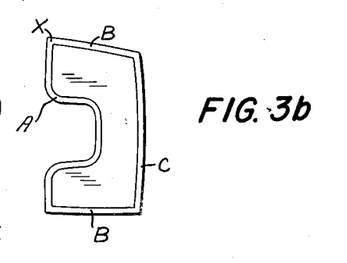

With the even more complex parts shown in Figs. 3a and 3b the sequence of chamfering is the same when these parts are chamfered in pairs or individually one after another, and this sequence is ABCBABCBABCBABCB, etc., the chamfering of each piece starting at the corner x indicated in Figs. 3a and 3b.

Up to the present time it has not been possible to carry out a sequence of edge chamfering as indicated above in an automatic manner. The present invention provides a machine capable of adjusting a single guide means for the sheet material with a single actuating member accessible to the operator, such as, for example, an electrical switch, to carry out any desired series of adjustments of the guide means in any given sequence with each setting of the guide means being fully independent of the other setting thereof.

Figures 4, 5A, 5B:
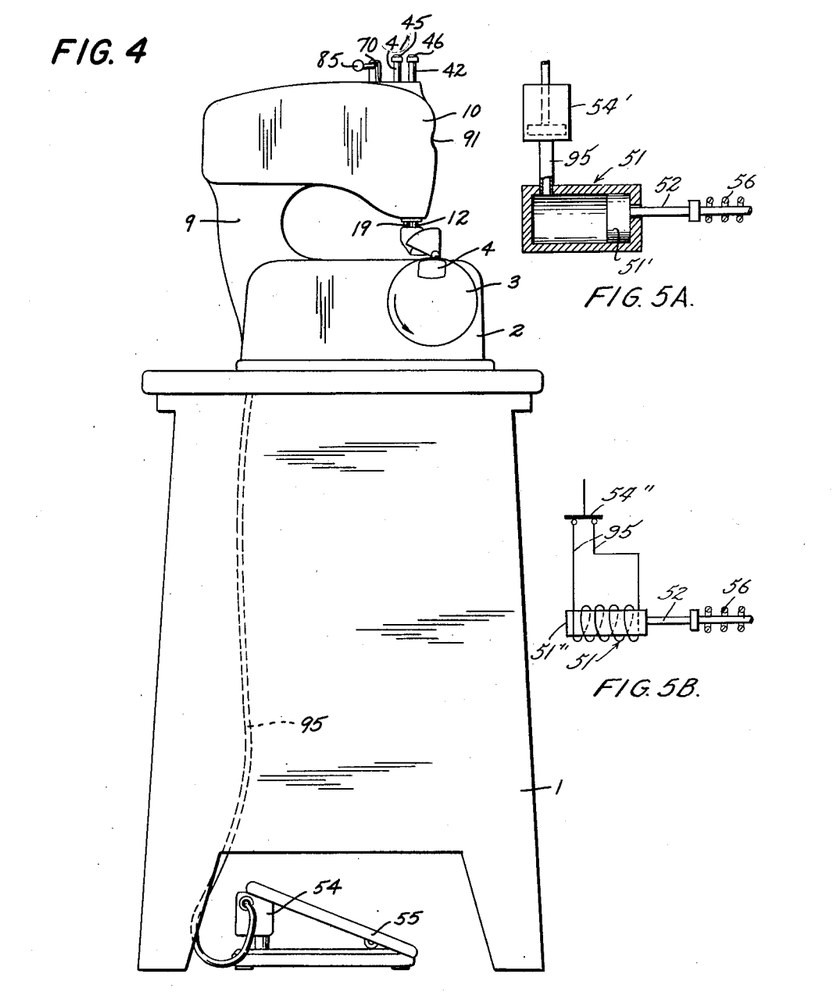
Fig. 4 is a simplified schematic side elevational view of a machine constructed in accordance with the present invention.
Fig. 5a is a schematic partly sectional view of moving means.
Fig. 5b is a schematic view of electrical moving means.
Figures 5, 8:
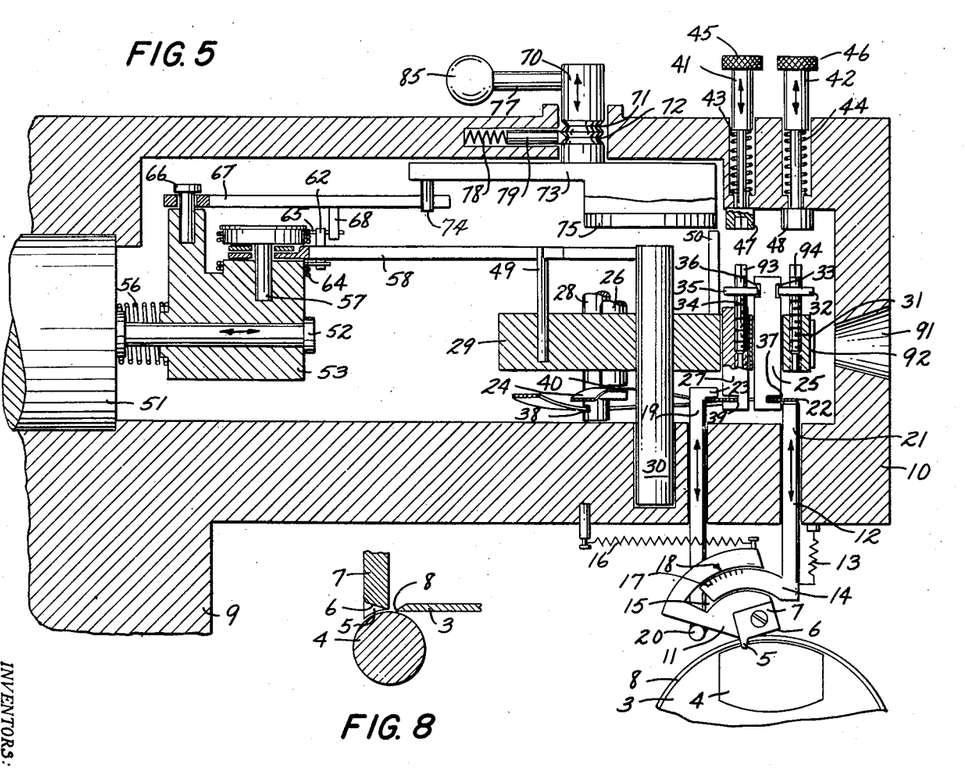
Fig. 5 is a fragmentary, partly diagrammatic, sectional, elevational view through the upper operating head of the machine of Fig. 4 showing parts of the mechanism of the invention located within the operating head.
Fig. 8 is a diagrammatic, fragmentary, sectional illustration of the relationship between the cutter and the sheet material guide of the invention.

Referring now to Fig. 4, it will be seen that the machine frame 1 carries a housing 2 forming part of a support means for turnably carrying a cylindrical cutter 3, diagrammatically shown in the drawings and rotated about its axis by any suitable motor or the like (not shown). Furthermore, as is shown in Figs. 4 and 5 a feed roller 4 is provided to feed the sheet material to the cutter 3, this feed roller 4 also being diagrammatically shown in the drawings. The feed roller 4 is supported for turning movement about a horizontal axis as viewed in Figs. 4 and 5, and it will be noted that the curvature of the outer surface of the feed roller 4 corresponds to that of the cylindrical cutter 3 (see also Fig. 8). The manner in which the feed roller 4 is supported for turning movement forms no part of the present invention and is well known. The sheet material which is to be cut in addition to being fed by the roller 4 toward the cutting edge 8 of the cylindrical cutter 3 is guided along a side surface of a stop member 5 which in the example illustrated in the drawings is integral with a guide member 7 having a curved guiding edge 6 which intersects the side surface of stop 5 along which the sheet material moves. The guide means 7 is carried by a holder 11 (Fig. 5), and while stop 5 may be separate from guide 7 and carried independently by the holder 11, it is preferred in accordance with the present invention to make the stop 5 integral with the guide 7. The machine of the present invention includes structure for regulating both the distance between guide 7 and cutter 3 in a vertical direction, as viewed in Fig. 5, as well as the angle therebetween.

The support means, part of which is formed by the housing 2, includes an upwardly extending arm 9 integral with the housing 2 and carrying hollow operating head 10 in which the mechanism of the invention is located. Referring to Fig. 5, it will be seen that the adjustment means for adjusting the distance in a vertical direction, as viewed in Fig. 5, between the guide means 7 and the cutter 3 includes a rod 12 which is axially movable in a suitable bore of the support means formed by the operating head 10. A spring 13 is fixed at one end of the support means and at its opposite end to a lug fixed to an extending laterally from the rod 12 so as to continually urge the latter upwardly as viewed in Fig. 5. The rod 12 carries at its lower end an arcuate extension 14 which is fixed to the rod 12, as by being formed integrally therewith and which extends laterally therefrom, as shown in Fig. 5, this arcuate extension 14 forming a part of a cylinder whose axis is preferably located at the intersection between the curved guide surface 6 and the stop 5. The holder 11 is formed with an arcuate cutout 15 mating with the extension 14 and into which this latter extension extends so that the holder 11 is turnable on the extension 14 about the axis of the cylinder of which extension 14 forms a part. Thus, axial movement of the rod 12 will regulate the distance between guide means 7 and cutter 3 while turning a holder 11 on extension 14 will regulate the angle between the guide means and cutter 3, this angle being readable on a scale 17 having graduations 18 located on the extension 14, as indicated in Fig. 5. The angular adjustment is provided by a rod 19 having a bottom end 20 making an approximate right angle with the rest of the rod 19 and on which the holder 11 rests, the holder 11 being urged downwardly against the end 20 of the rod 19 by a spring 16 connected at one end to the holder 11 and at its opposite end to the stationary support means. Thus, as the rod 19 moves up and down the angle between guide means 7 and cutter 3 may be regulated independently of the particular elevation of the rod 12. As the holder 11 turns in a counterclockwise direction, as viewed in Fig. 5, to the left from the extension 14, the angle between guiding edge 6 and cutter 3 will increase, while when the holder 11 turns in the opposite direction onto the extension 14 and toward the rod 12, this cutting angle will decrease.

The top end 21 of the rod 12 bears, under the influence of spring 13, against the lower surface of a ring 22 made of a flexible resilient material such as spring steel, for example, and the top end 23 of the rod 19, which is bent from the rod as indicated in Fig. 5, bears downwardly against the top surface of another ring 24 under the influence of the spring 16. The ring 24 is similar to the ring 22 but is of a different diameter. The ring 22 extends into cutouts 37 and 38 of a pair of positioning pins 25 and 28, respectively, so that by adjusting the elevation of these positioning pins 25 and 28 it is possible to locate the parts of ring 22 engaging these pins at predetermined elevations. Thus, for example, the pin 25 shown in Fig. 5 locates the part of ring 22 extending into cutout 37 at a predetermined elevation which controls the distance between guide means 7 and cutter 3 when the pin 25 is in the position shown in Fig. 5, and similarly the pin 28 when it is located in the position of pin 25.

shown in Fig. 5, in a manner described below, will regulate the elevation of the rod 12 in accordance with the setting of this pin 28 into whose cutout 38 the ring 22 also extends. The ring 24 similarly extends into a pair of cutouts 39 and 40 respectively formed in a pair of positioning pins 27 and 26, and in the position of pin 27 shown in Fig. 5, it is evident that the elevation of this pin 27 controls the angular setting of the guide means 7. In the same way when the positioning pin 26 is located in the position of pin 27 shown in Fig. 5, in a manner described below, the particular setting of this pin 26 will control the angle of the guide means 7. As is evident from Fig. 5, the positioning pins are arranged in pairs with one pin of each pair controlling the distance of the guide means from the cutter and the other pin of each pair controlling the angle between the guide means and the cutter. Thus, Fig. 5 shows the pair of positioning pins 25 and 27 in their operative position and the pair of positioning pins 26 and 28 spaced from the pair of pins 25 and 27. A third pair of positioning pins is also provided, and the three pairs of positioning pins are angularly spaced from each other by 120° about the stationary shaft 30 fixed to and extending upwardly from the bottom wall of the support means formed by the operating head 10. This shaft 30 supports a body in the form of a drum 29 for rotation about the axis of the shaft 30, the drum 29 being shown diagrammatically in Fig. 5 and being supported by any suitable collars or the like fixed to the shaft 30 for rotation about the latter without axial movement therealong. The drum 29 may take the form of a solid cylinder coaxial with the shaft 30 and formed with an axial bore through which the shaft 30 extends. As is evident from the drawings, the drum 29 is formed with pairs of axial bores into which the pairs of pins 25, 27, and 28, 26, as well as the unillustrated pair freely extend, these pairs of bores of course being spaced angularly from each other by 120° about the shaft 30.

The axial position of the positioning pins is determined by screw means operatively connected to these positioning pins. Fig. 5 shows the screw means associated with the pair of positioning pins 25, 27 and identical screw means is associated with the other two pairs of positioning pins. Thus, referring to Fig. 5 it will be seen that the drum 29 is formed with a threaded bore into which a screw member 31 threadedly extends, this screw member being coaxial with shaft 30 and pin 25 and having a collar 32 fixed thereto and extending at its periphery into a cutout 33 formed in the position pin 25. Under the influence of the spring 13, the pin 25 will bear against the collar 32 without any play, and in the same way the spring 13 will eliminate any play between parts 25, 22, and 12, and by turning the screw 31 the collar 32 will move up and down with the screw to regulate the elevation of the positioning pin 25 so that in this way the elevation of the part of ring 22 extending into cutout 37 may also be regulated. A second screw member 34 extends threadedly into a threaded bore formed in the positioning pin 27, as shown in Fig. 5, and this screw member 34 has fixed thereto a collar 35 whose periphery extends into a cutout 36 of the positioning pin 25, the spring 16 eliminating any play between collar 35 and pin 25 as well as between pin 27, ring 24, and rod 19 and holder 11. The spring 13 is stronger than the spring 16 so that the spring 13 determines the position of pin 25 with respect to collar 32 and so that this position cannot be changed by spring 16 within the limits of whatever clearance there is between the cutout 33 and the collar 32. It will be noted that a turning of the screw 31 will adjust the elevation of the guide means 7 without in any way changing the angle thereof, since the angular adjusting means will move as a unit together with the structure for adjusting the distance between the guide means 7 and the cutter 3, and on the other hand, the turning of the screw 34 adjusts the angle of the guide means 7 in a manner completely independent of the particular distance between the guide means 7 and the cutter 3.

Each of the screw members 31 and 34 is provided with a head end through which the screw member is turned. Thus, the screw member 31 has a non-circular head end 94, and the screw member 34 has a non-circular head end 93. The top wall of the operating head 10 is formed with a pair of bores spaced from each other and with respect to the axis of shaft 30 in the same way as the pair of bores which receive the pair of positioning pins 25 and 27. These bores of the top wall of the operating head 10 respectively accommodated a pair of key means 41 and 42 for respectively turning the screws 34 and 31. The key means 41 is provided with a knurled head 45 and is provided with an elongated portion of reduced diameter surrounded by a spring 43 which engages a shoulder of the key means 41 to urge the latter upwardly, the bottom end of the key means 41 carrying the enlargement 47 incapable of passing through the bore of the top wall and formed with a recess having a shape corresponding to that of the head 93. Thus, the key means 41 may be depressed to place the end 47 of the key means 41 about the head 93 so that the latter together with screw 34 may be turned by turning the knurled head end 45 of the key means 41. In the same way, the key means 42 is surrounded by a spring 44 urging the latter upwardly, and the key means 42 has a knurled head 46 and a bottom enlarged end 48 formed with the recess which receives the head end 94 of screw 31 when the key means 42 is depressed. Of course, it is necessary for the positioning pins 25 and 27 to be in the operating position shown in Fig. 5 in order to locate the screw members 34 and 31 respectively in line with the key means 41 and 42. Thus, it is only possible to adjust the screws 34 and 31 when the positioning pins 25 and 27 are in their operating position. A screw means identical with that described is associated with the pair of pins 26, 28 and with the unillustrated pair of pins, and these latter two screw means must also be located in the operating position shown in Fig. 5 before they can be adjusted.

Figures 6, 7:
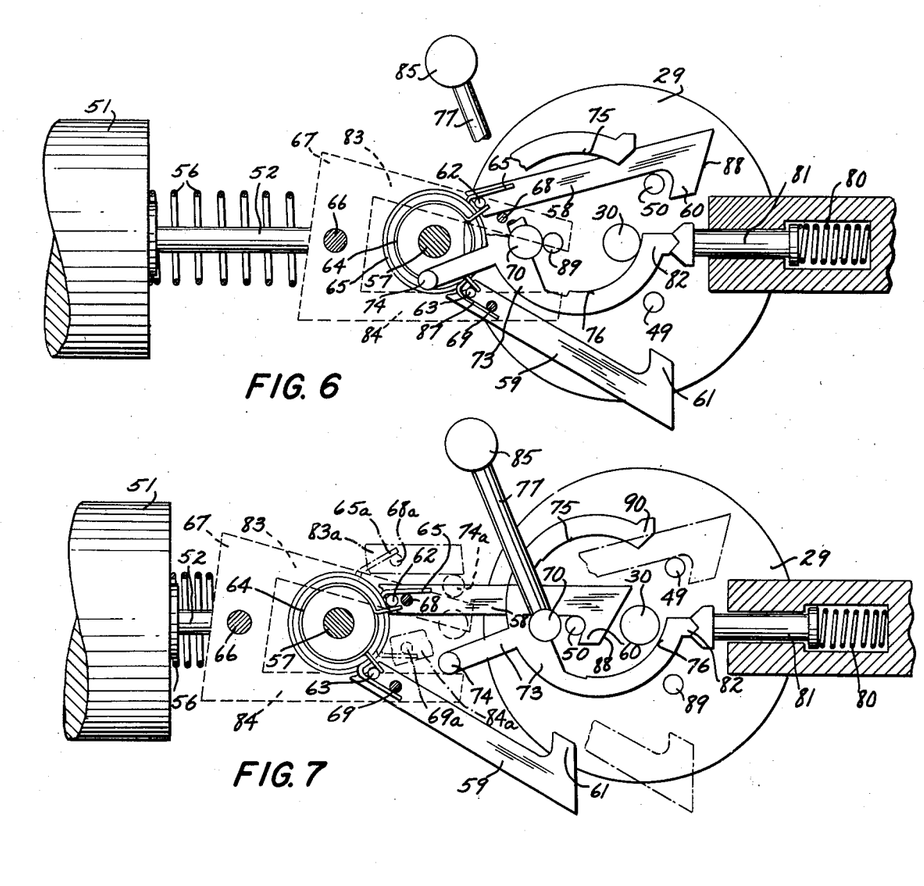
Fig. 6 is a fragmentary top plan view showing diagrammatically parts of the mechanism of Fig. 5 in one operating position thereof.
Fig. 7 is a view corresponding to Fig. 6 showing the parts thereof in a different operating position.

In addition to the above described elements connected to the drum 29, this drum carries three turning pins 49, 50, and 89, the pin 89 being shown only in Figs. 6 and 7. These turning pins are all parallel to the shaft 30 and all extend upwardly from the drum 29, the pin 50 extending upwardly through a distance greater than the pins 49 and 89 for a purpose described below. The three turning pins are equal in number to the number of pairs of positioning pins and they are spaced angularly from each other by 120° about the shaft 30 in the same way as the three pairs of positioning pins. As will be evident from the description which follows one turning pin corresponds to one pair of positioning pins and when one of the turning pins is located in a given position the pair of positioning pins associated therewith is located in the operating position. Thus, in Fig. 5, the turning pin 49 corresponds with the pair of pins 25, 27 and when the pin 49 is located in the position shown in Fig. 5 the pins 25, 27 are in the operating position also shown in Fig. 5.

The operating head 10, which forms part of the support means in the structure of the invention, carries an element 51 which forms part of the moving means for moving elements within the operating head 10. This moving means may be either hydraulic as shown in Fig. 5A or electrical as shown in Fig. 5B and the element 51 may, for example, take the form of a cylinder in which a piston 51' fixed to the rod 52 is slidable, or element 51 may be in the form of a solenoid having an armature 51" connected to the rod 52. The moving means is set into operation by an actuating element 54 (Fig. 4) accessible to the operator and capable of being operated by a foot pedal 55. This actuating element 54 may be in the form of an electrical switch 54" which is closed upon depression of pedal 55 to complete a circuit to the solenoid, or element 54 may be in the form of a piston and cylinder 54' which transmits a fluid under pressure to the hydraulic cylinder upon depression of the pedal 55. With the machine of the invention each change in the setting of the guide means 7 requires only a depression of the pedal 55 which returns to its starting position shown in Fig. 4 under the influence of a suitable spring or the like. Thus, it is necessary to return the parts automatically to their starting position so that the depression of pedal 55 serves only to move the rod 52 from its starting position to its end position, the rod 52 being movable back to its starting position automatically. For this purpose, a spring 56 surrounds the rod 52 and urges the latter to its starting position shown in Fig. 6. The electrical or hydraulical impulse transmitted to part 51 by depression of pedal 55 serves to move rod 52 to the left, as viewed in Figs. 5 and 7, against the influence of spring 56 from the starting position shown in Fig. 6 to the end position shown in Fig. 5. The mechanism is also illustrated in its end position in Fig. 7. The rod 52 automatically moves back to its starting position under the action of the spring 56 which is free to return the rod 52 as soon as the pedal 55 is released by the operator. The element 54 is interconnected with element 51 by a cable 95 which may contain electrical leads as indicated in Fig. 5b or which may be in the form of a flexible conduit for a hydraulic fluid under pressure as indicated in Fig. 5a.

The rod 52 supports a carrier 53 in the form of a block which carries a pivot pin 57 which serves to turnably mount a pair of engaging means 58 and 59 on the carrier 53. These engaging means 58 and 59 (Figs. 6 and 7) are respectively provided with hook ends 60 and 61, and the engaging means 58 and 59 further having pins 62 and 63 respectively fixed thereto and extending upwardly therefrom, only engaging means 58 being visible in Fig. 5. As is evident from Figs. 5–7 each of the engaging means is formed at its left end, as viewed in Figs. 5–7, with a bore through which the pivot pin 57 passes, this pivot pin 57 having an enlarged head end which retains the pair of engaging means 58 and 59 on the carrier 53, and the pair of engaging means 58 and 59 overlap each other at their pivotal connection to the carrier 53 in a manner similar to a pair of scissors' blades so that the pair of engaging means 58 and 59 are located in the same horizontal plane and are independently turnable about the pivot pin 57. A spring 64, shown beneath the pair of engaging means in Fig. 5, is coiled about a circular part of the carrier 53 and has a pair of free ends respectively located between and engaging the pins 62 and 63 to urge the latter and the engaging means 58 and 59 therewith, respectively, outwardly away from each other, as is evident from Fig. 6. A second spring 65 is coiled about the enlarged head end of the pivot pin 57 and has a pair of free ends also engaging the pins 62 and 63, respectively. However, the spring 65, which is stronger than the spring 64, urges these pins toward each other so that the stronger spring 65 urges the pair of engaging means 58 and 59 toward each other. As is evident from Fig. 5, the pin 62 extends through the engaging means 58, and the upper portion of pin 62 is engaged by spring 65 while the lower portion of pin 62 is engaged by spring 64, and the same is true of the pin 63 which extends through the engaging means 59. Figs. 6 and 7 are diagrammatic illustrations of the manner in which the parts operate, and in order to clearly illustrate the operation both of the springs 64 and 65 are shown above the engaging means 58 and 59. However, Fig. 5 shows an actual construction. Thus, if the pair of engaging means 58 and 59 were subject only to the influence of the springs 64 and 65, the pair of engaging means would be located closely adjacent each other since the stronger spring 65 urges the pair of engaging means toward each other through the pins 62 and 63.

The carrier 53 also is provided with a pivot pin 66 on which a positioning means 67 is turnably mounted. This positioning means 67 is in the form of a substantially U-shaped plate having a pair of legs 83 and 84 extending horizontally to the right, as viewed in Figs. 5–7, and located over the pair of engaging means 58, 59. The leg 83 has a pin 68 fixed to and extending downwardly therefrom, and as is evident from Fig. 5 the bottom end of pin 68 overlaps the top end of pin 62 and is also engaged by the spring 65. In the same way the leg 84 carries a pin 69 which is fixed to and extends downwardly from the leg 84, which overlaps the top end of the pin 63, and which is also engaged by the spring 65, as shown diagrammatically in Figs. 6 and 7.

A manually operable turning means is provided for turning the positioning means 67, and this turning means takes the form of a handle 85 fixed to the free end of a lever 77 whose opposite end is fixed to a shaft 70 extending downwardly through a bore in the top wall of operating head 10 and formed with annular grooves 71, 72 which cooperate with the detent 79 urged by spring 78 toward these grooves, for a purpose described below. The bottom end of the shaft 70 is fixed to an arm 73 which extends laterally to the left from the shaft 70 and which has fixed to its left free end portion a pin 74 which extends downwardly from the arm 73 into the space between the legs 83 and 84 of the turning means 67. The shaft 70 is also fixed to a pair of arcuate extensions 75 and 76, which may be formed integrally with the arm 73, as shown in Fig. 7, and which respectively have outwardly extending free end portions 90 and 82 of a substantially V-shaped cross section. The operating head 10 is provided in the wall portion thereof with a bore in which a string 80 is located, and this spring 80 urges the pin 81 (Figs. 6 and 7) to the left, as viewed in Figs. 6 and 7. The pin 81 has a left free end portion formed with a groove of V-shaped cross section adapted to alternately receive the free ends 82 and 90 of the extensions 76 and 75, respectively. In the position of the parts shown in Figs. 6 and 7 the free end 82 of the extension 76 is releasably located by the spring pressed pin 81 in the illustrated angular position. Furthermore, as is shown in Fig. 5, the spring 78 urges the detent 79 into the lower annular groove 72 of the shaft 70 to maintain the latter in the upper operating position shown in Fig. 5. In this position the extensions 75 and 76 are located above the top end of the longer turning pin 50, as shown in Fig. 5. The left free end of the pin 81 is thick enough to remain in engagement with end 82 or end 90 of the extensions 76 and 75, respectively, when the shaft 70 is moved down to the position where detent 79 extends into the groove 71. In the angular position of shaft 70 which is determined by cooperation between pin 81 and end 82 of extension 76, shown in Figs. 6 and 7, the pin 74 engages the leg 84 of the turning means 67 and locates the turning means 67 in the position indicated in Figs. 6 and 7 where the leg 84 is parallel to the rod 52 and is parallel to the axis along which rod 52 reciprocates, this axis being normal to the axis of shaft 30. During reciprocation of the carrier 53 together with the rod 52, the inner side surface of the leg 84 slides along the pin 74 without in any way changing the angular position of the turning means 67 with respect to the carrier 53. When the handle 85 is turned in a counterclockwise direction, as viewed in Figs. 6 and 7, to move the pin 74 into engagement with the leg 84 and turn the turning means 67 in a clockwise direction about the pin 66, as viewed in Figs. 6 and 7, to the position shown in Figs. 6 and 7, the pin 69 which is fixed to and extends downwardly from the leg 84 engages the spring 65 to turn the free end 87 thereof shown in Figs. 6 and 7 in a clockwise direction so as to release the pin 63 of the engaging means 59 to the influence of the weaker spring 64 which now is capable of turning the engaging means 59 outwardly away from its operating position to the inoperative position shown in Figs. 6 and 7. Thus, with the engaging means 59 in the inoperative position shown in Figs. 6 and 7, it is not possible for the hook end 61 of this engaging means to engage any of the turning pins 89, 49, or 50.

On the other hand, when the shaft 70 has been manually turned as described above, to actuate the turning means 67 to cause the latter to allow the spring 64 to turn engaging means 59 out of its operative position, the pin 68 carried by the other leg 83 of the turning means 67 does not prevent the spring 65 from locating the engaging means 58 in its operating position shown in Fig. 7. As is evident from Fig. 7, the pin 68 is located directly to the right of the pin 62 and thus the spring 65 is capable of placing the engaging means 58 in a position where it extends parallel to the axis of reciprocation of the rod 52 and carrier 53 in the position of the parts shown in solid lines in Fig. 7.

It is pointed out that the engaging means 58 is shown in solid lines in Fig. 7 in the end position of the rod 52 and carrier 53 where the spring 56 has been compressed to the fullest extent as a result of the impulse derived from actuation of the pedal 55. In this position, the right face 88 of the engaging means 58 is directed toward the shaft 30 and makes an angle with the axis of reciprocation as indicated in Fig. 7. In this solid line position of engaging means 58 shown in Fig. 7 this engaging means has just completed its movement to the left, as viewed in Fig. 7, and by its engagement with the turning pin 50 and has turned the latter pin together with the drum 29 in a counterclockwise direction about the shaft 30, as viewed in Fig. 7, in order to locate the pair of positioning pins corresponding to the turning pin 50 (not shown) in the operating position where the pins 25 and 27 are located in Fig. 5. When the parts are returned to their starting position by the spring 56, the face 88 of the engaging means 58 will cooperate with the shaft 30 to turn the engaging means 58 outwardly in a counterclockwise direction about the pin 57, and when the parts are again in their starting position the face 88 will have engaged the next turning pin 49 to continue the outward turning movement of the engaging means 58 and to locate the latter in the dot-dash line position shown in Fig. 7. It will be noted that in this position the hook end 60 of the engaging means 58 overlaps the turning pin 49 so that when the pedal 55 is again depressed to move rod 52 and carrier 53 to the left, as viewed in Fig. 7, the engaging means 58 will then turn the turning pin 49 to the position where the pin 50 is located in Fig. 7, and this position of the parts is also illustrated in Fig. 5. Thus, it is apparent that with the parts in the position shown in Figs. 6 and 7, each depression of the pedal 55 will result in turning of the drum 29 in a counterclockwise direction about the shaft 30 as viewed in Figs. 6 and 7 through 120°, and with this arrangement the pairs of positioning pins will successively be moved to the operating position directly beneath the key means 41, 42 so that the rings 24 and 22 determine the particular setting of the guide means 7 at each of the three angular positions of the drum 29. With the parts in the position of Figs. 6 and 7, it is thus possible for the operator to change from one setting of the guide means 7 to another simply by depression of the pedal 55, and furthermore, it is possible to cyclically vary the position of the guide means 7 repeatedly through cycles each of which includes a series of three positions of the guide means 7. Thus, with the machine of the invention and with the setting of the parts shown in Figs. 6 and 7 it is possible to carry out chamfering of pieces of the type shown in Figs. 2a and 2b where the left piece, for example, is chamfered according to the sequence ABCABCABC, etc.

It will be noted that this latter series of operations is suitable for the left shoe part shown in Fig. 2a. The right shoe part shown in Fig. 2b is cut according to the sequence CBACBACBA, etc., and thus in order to carry out these operations it is only necessary to reverse the direction of the drum 29. In order to do this, before starting the chamfering of the workpiece shown in Fig. 2b the operator grasps the handle 85 and turns the arm 77 together with the shaft 70 in a clockwise direction, as viewed in Figs. 6 and 7. As a result the free end 90 of the extension 75 becomes engaged by the spring pressed pin 81 to determine the angular position of the shaft 70. Furthermore, the pin 74 turns together with the arm 73 away from leg 84 of the turning means 67 and into engagement with the leg 83 to turn the turning means 67 in a counterclockwise direction about the pin 66, as viewed in Fig. 7, and to locate the leg 83 in the dot-dash line position 83a shown in Fig. 7 where this leg 83 is parallel to the axis of reciprocation of the rod 52 and slides along the pin 74, which is now in position 74a shown in Fig. 7, without changing the angular position of the turning means 67 with respect to the pin 66. Upon turning of the turning means 67 in this manner, the pin 69 moves inwardly to release the pin 63 and engaging means 59 to the action of the free end 87 of the spring 65, pin 69 becoming located in position 69a and the engaging means 59 thus being located in a position where it extends parallel to the direction of reciprocation of the rod 52 and carrier 53. The movement of pin 68 to the position 68a frees the pin 62 of engaging means 58 to the influence of the weaker spring 64 which thus turns the engaging means 58 outwardly away from its operating position to an inoperative position. Thus, the manual setting means formed by arm 73 and shaft 70 turns the turning means 67 so as to position the engaging means 59 in its operating position when the engaging means 58 is simultaneously moved from its operating position, and vice versa. It is evident that when the engaging means 59 is in its operating position this engaging means will successfully engage the three turning pins during reciprocation of the rod 52 and will turn the drum 29 in a clockwise direction about shaft 30, as viewed in Figs. 6 and 7, through 120°, during each reciprocation of the rod 52. Thus, when the engaging means 59 is in its operating position the drum 29 may be turned through increments of 120° in a clockwise direction, and with this position of the parts it is possible to reverse the series of operations of each cycle so that it is possible, for example, with this manual adjustment to change over from chamfering the workpiece shown in Fig. 2a to chamfering the workpiece shown in Fig. 2b.

It is also possible to manually operate the setting means formed by shaft 70 and the parts connected thereto in order to enable the machine to carry out the operations required for chamfering the workpieces shown in Figs. 3a and 3b. As was pointed out above, these workpieces are chamfered according to a sequence ABCBABCBABCB, etc. Thus, in order to carry out these operations it is necessary to go through a series of three adjustments of the guide means 7 during one cycle and during the next cycle it is necessary to carry through the reverse sequence of the series of positions.

In order to accomplish this result the shaft 70 is depressed so that the detent 79 becomes located in the upper groove 71, and in this position of the parts the arcuate extensions 75 and 76 overlap the top free end portion of the turning pin 50 which extends higher than the turning pins 49 and 89. Furthermore, as is evident from Figs. 6 and 7 the extensions 75 and 76 are located in the path of turning movement of the pin 50, the turning pins 49 and 89 simply moving beneath the extensions 75 and 76.

Assuming that the parts are in this position and at a given instant have the solid line position shown in Fig. 7, it is evident that the next reciprocation will cause the engaging means 58 to engage the turning pin 49 and turn the drum 29 in a counterclockwise direction through 120° so that with reference to Fig. 7 the pin 49 moves to the position of pin 50 and the latter pin moves to the position of pin 89 shown in Fig. 7, pin 89 turning to the position of pin 49. As the pin 50 turns in a counterclockwise direction through 120°, as viewed in Fig. 7, it will engage the inner surface of the extension 76 and turn the latter together with the shaft 70 and handle 77 in a clockwise direction, as viewed in Fig. 7, until the free end 90 of the extension 75 is located in the notch of the spring pressed pin 81. Thus, the setting means has been automatically turned to set the parts in the position where engaging means 58 is out of its operating position and engaging means 59 is in its operating position. Thus, during the next succeeding reciprocation the engaging means 59 will engage the turning pin 50 which is now located in the position of pin 89 of Fig. 7 and the drum 29 will now be turned in a clockwise direction through 120° to again locate the pin 50 in the position of Fig. 7. During the next succeeding reciprocation of the parts the engaging means 59 remains in its operative position and engages the pin 89 to turn the latter in a clockwise direction through 120°, and during such turning of the pin 89 the pin 50 turns from the position of Fig. 7 through 120° in clockwise direction and of course engages the extension 75 to turn the latter together with the setting means back to the position of the setting means shown in Fig. 7. Thus, when the pin 50 is located in the position of pin 49 of Fig. 7 the setting means has again been automatically turned to again place the parts in the position where engaging means 58 is in its operating position and engaging means 59 is out of its operating position. Thus, during the next succeeding reciprocation the pin 50 will be turned in a counterclockwise direction, as viewed in Fig. 7, back to the position illustrated in Fig. 7.

It is evident, therefore, that with the shaft 70 depressed so that the detent 79 extends into an annular groove 71, the structure of the invention will automatically turn the drum 29 back and forth through 240° in increments of 120°. In other words, the drum 29 will make two turns of 120° each in one direction and then two turns of 120° each in the opposite direction, and these two turns are sufficient. Furthermore, although the drum 29 only turns through 240° under these conditions, nevertheless each of the turning pins is located successively in three different angular positions. Thus, with this setting of the parts it is possible for the machine of the invention automatically to carry out the sequence of steps required for chamfering workpieces of the type shown in Figs. 3a and 3b, according to which the edges are chamfered in the sequence ABCBABCBABCBABCB, etc.

As is evident from Fig. 5, the operating head 10 is provided with a window 91 through which indicia 92, such as letters or numbers located on the outer side face of the drum 29, is visible in order to indicate the angular position of the drum 29 and, therefore, show the particular setting of the guide means 7.

As a result of the above-described features according to which the axis of the cylinder of which extension 14 forms a part is located approximately at the intersection of the curved face 6 of guide means 7 and the surface of the stop 5 along which the material is moved by the operator, a change in the angle of the guide means 7 with respect to the cutter 3 has absolutely no influence upon the elevation of the guide means 7 with respect to the cutter 3.

Furthermore, it will be noted that it is perfectly possible for the operator to adjust any particular setting during the operation of the machine simply by actuating the key means 41 or 42 when one of the screw members is located thereunder.

The above-described machine is suitable for use where three different adjustments of the guide means are required. However, the same principle obviously may be applied by those skilled in the art to make a machine capable of producing four or more different positions of the setting means. It will be noted that with the shaft depressed to the position where detent 79 is located in groove 71, not only is the machine capable of performing the operations required for chamfering edges of the pieces shown in Figs. 3a and 3b, but in addition the machine with this position of the parts is capable of chamfering with the workpieces shown in Figs. 2a and 2b in pairs according to the sequence ABCCBAABCCBA, etc. The workpieces of Figs. 1a and 1b require only two different adjustments of the setting means, and the machine described is capable of being used for this purpose also simply by providing the one adjustment at the first and at the third operating positions of the drum 29, whilst the other adjustment is provided at the second operating position of the drum 29. If in the sequence ABCBABCBA the adjustment C is made equal the adjustment A, it gives as a result the sequences of Figs. 1a and 1b, namely: ABABAB or BABABA or ABBAABBA.

The particular advantage of the invention resides in the fact that the operator need not be concerned with the settings once the several settings are set up. All the operator need do is depress the pedal 55 in order to change from one setting to the next and the operator only handles the workpieces. On the other hand, it is always possible to vary an adjustment during the operation, as was pointed out above. Moreover, each adjustment of the guide means 7 is completely independent of every other adjustment, and furthermore, the angular adjustments are completely independent of the distance between the guide means 7 and the cutter 3. Furthermore, it will be noted that the rings 24 and 22 provide a gradual movement of the guide means 7 from one adjusted position to the next adjusted position so that any sudden movement of this guide means is avoided.

It will be understood that each of the elements described above, or two or more together, may also find a useful application in other types of cutting machines differing from the types described above.

While the invention has been illustrated and desired as embodied in machines for chamfering sheet material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A machine for cutting sheet material such as leather and the like, comprising, in combination, support means; cutting means carried by said support means for cutting the sheet material; guide means located adjacent said cutting means for guiding material to be cut by said cutting means; first adjusting means operatively connected to said guide means for adjusting the distance between the same and said cutting means; second adjustting means operatively connected to said guide means for adjusting the angle of said guide means independently of said first adjusting means with respect to said cutting means; and moving means operatively connected to said first and second adjusting means for actuating the same to set said guide means successively at a plurality of different elevational and angular positions with respect to said cutting means.

2. A machine for cutting sheet material such as leather and the like, comprising, in combination, support means; cutting means carried by said support means for cutting the sheet material; guide means located adjacent said cutting means for guiding material to be cut by said cutting means; first adjusting means operatively connected to said guide means for adjusting the distance between the same and said cutting means; second adjusting means operatively connected to said guide means for adjusting the angle of said guide means independently of said first adjusting means with respect to said cutting means; a body turnably carried by said support means; transmission means interconnecting said body with said first and second adjusting means for moving the latter to different positions during turning of said body so as to locate said guide means at a plurality of different elevational and angular positions with respect to said cutting means when said body is at different angular positions with respect to its axis of rotation, respectively; and turning means operatively connected to said body for turning the same.

3. A machine for cutting sheet material such as leather and the like, comprising, in combination, support means; cutting means carried by said support means for cutting the sheet material; guide means located adjacent said cutting means for guiding material to be cut by said cutting means; first adjusting means operatively connected to said guide means for adjusting the distance between the same and said cutting means; second adjusting means operatively connected to said guide means for adjusting the angle of said guide means independently of said first adjusting means with respect to said cutting means; a body turnably carried by said support means; transmission means interconnecting said body with said first and second adjusting means for moving the latter to different positions during turning of said body so as to locate said guide means at a plurality of different elevational and angular positions with respect to said cutting means when said body is at different angular positions with respect to its axis of rotation, respectively; and turning means operatively connected to said body for turning the same in one direction successively and repeatedly to a series of predetermined positions with respect to its axis of rotation so as to cyclically move said guide means through a series of different angular and elevational positions with respect to said cutting means during each cycle.

4. A machine for cutting sheet material such as leather and the like, comprising, in combination, support means; cutting means carried by said support means for cutting the sheet material; guide means located adjacent said cutting means for guiding material to be cut by said cutting means; first adjusting means operatively connected to said guide means for adjusting the distance between the same and said cutting means; second adjusting means operatively connected to said guide means for adjusting the angle of said guide means independently of said first adjusting means with respect to said cutting means; a body turnably carried by said support means; transmission means interconnecting said body with said first and second adjusting means for moving the latter to different positions during turning of said body so as to locate said guide means at a plurality of different elevational and angular positions with respect to said cutting means when said body is at different angular positions with respect to its axis of rotation, respectively; and turning means operatively connected to said body for turning the same first in one direction and then in the opposite direction about its axis of rotation to a predetermined series of positions with respect to said axis of rotation so as first to move said guide means in succession through a series of positions with respect to said cutting means, when said body turns in said one direction, and then move said guide means back through said series of positions during turning of said body in said opposite direction.

5. A machine for cutting sheet material such as leather and the like, comprising, in combination, support means; cutting means carried by said support means for cutting the sheet material; guide means located adjacent said cutting means for guiding material to be cut by said cutting means; first adjusting means operatively connected to said guide means for adjusting the distance between the same and said cutting means; second adjusting means operatively connected to said guide means for adjusting the angle of said guide means independently of said first adjusting means with respect to said cutting means; a body turnably carried by said support means; transmission means interconnecting said body with said first and second adjusting means for moving the latter to different positions during turning of said body so as to locate said guide means at a plurality of different elevational and angular positions with respect to said cutting means when said body is at different angular positions with respect to its axis of rotation, respectively; and turning means operatively connected to said body for turning the same and having a first position where said turning means turns said body successively through predetermined angles in one direction about the turning axis of said body, a second position where said turning means turns said body successively through predetermined angles in an opposite direction about said axis, and a third position where said turning means turns said body automatically first in said one direction and then in said opposite direction.

6. A machine for cutting sheet material such as leather and the like, comprising, in combination, support means; cutting means carried by said support means for cutting the sheet material; guide means located adjacent said cutting means for guiding material to be cut by said cutting means; first adjusting means operatively connected to said guide means for adjusting the distance between the same and said cutting means; second adjusting means operatively connected to said guide means for adjusting the angle of said guide means independently of said first adjusting means with respect to said cutting means; a body turnably carried by said support means; transmission means interconnecting said body with said first and second adjusting means for moving the latter to different positions during turning of said body so as to locate said guide means at a plurality of different elevational and angular positions with respect to said cutting means when said body is at different angular positions with respect to its axis of rotation, respectively; turning means operatively connected to said body for turning the same and having a first position where said turning means turns said body successively through predetermined angles in one direction about the turning axis of said body, a second position where said turning means turns said body successively through predetermined angles in an opposite direction about said axis, and a third position where said turning means turns said body automatically first in said one direction and then in said opposite direction; and manually operable setting means carried by said support means and operatively connected to said turning means for setting the same in one of said first, second, and third positions.

7. In a machine for cutting sheet material such as leather and the like, in combination, support means including a stationary shaft; a drum turnably carried by said shaft; a plurality of positioning pins carried by said drum for turning movement therewith and forming part of an adjusting means for adjusting a guide for the sheet material, said positioning pins being spaced from each other by predetermined angles about the axis of said shaft; and a plurality of turning pins fixed to and extending from said drum, equal in number to the number of positioning pins, and angularly spaced from each other by angles of the same magnitude as those between said positioning pins, so that when said turning pins are successively located at a predetermined position with respect to said axis, said positioning pins will simultaneously be located successively at a second predetermined position with respect to said axis.

8. In a machine for cutting sheet material such as leather and the like, in combination, support means including a stationary shaft; a drum turnably carried by said shaft and formed with a plurality of axial bores spaced from each other by predetermined angles about the axis of said shaft; a plurality of positioning pins respectively extending freely into said bores so that said pins are freely movable therein and also are spaced from each other by said predetermined angles; a plurality of screw means carried by said drum and respectively connected operatively to said pins for adjusting the axial position thereof with respect to said drum, said pins forming part of an adjusting means for adjusting a guide for the sheet material; and a plurality of turning pins fixed to and extending from said drum, equal in number to the number of positioning pins, and angularly spaced from each other by angles of the same magnitude as those between said positioning pins, so that when said turning pins are successively located at a predetermined position with respect to said axis, said positioning pins will simultaneously be located successively at a second predetermined position with respect to said axis.

9. In a machine for cutting sheet material such as leather and the like, in combination, support means including a stationary shaft; a drum turnably carried by said shaft and formed with a pair of axially extending bores located adjacent each other; a first positioning pin extending freely into one of said bores and forming part of an adjusting means for adjusting the distance between a guide and a cutter; a second positioning pin extending freely into the other of said bores and forming part of a second adjusting means for adjusting the angle of a guide with respect to a cutter; first screw means carried by said drum and operatively connected to said first pin for axially adjusting the same with respect to said drum; and second screw means operatively connected to said second pin for axially adjusting the same with respect to said first pin but independently of the adjustment of said first pin.

10. In a machine for cutting sheet material such as leather and the like, in combination, support means including a stationary shaft; a drum turnably carried by said shaft and formed with a pair of axially extending bores located adjacent each other; a first positioning pin extending freely into one of said bores and forming part of an adjusting means for adjusting the distance between a guide and a cutter; a second positioning pin extending freely into the other of said bores and forming part of a second adjusting means for adjusting the angle of a guide with respect to a cutter; first screw means carried by said drum and operatively connected to said first pin for axially adjusting the same with respect to said drum; second screw means operatively connected to said second pin for axially adjusting the same with respect to said drum and independently of the adjustment of said first pin, each of said screw means including a screw member having a head end for turning the same; a wall forming part of said support means and located opposite a part of the circular path through which said first and second screw means turn together with said drum, said wall being formed with a pair of bores spaced from each other and with respect to the axis of said shaft in the same way as said drum bores; and a pair of key means respectively located in said wall bores for movement into and out of engagement with said head ends of said screw members for turning the latter so that only when the screw members are located opposite said key means, respectively, can the screw members be turned by said key means, respectively.

11. In a machine for cutting a sheet material such as leather and the like, in combination, support means including a stationary shaft; a drum turnably carried by said shaft and formed with a pair of axial bores angularly spaced from each other about the axis of said shaft; a pair of positioning pins respectively extending freely into said bores; adjusting means carried by said drum and operatively connected to said pins for independently adjusting the latter axially with respect to said drum; a flexible resilient ring extending between and carried by said pins so that the distance of said ring from said drum may be adjusted at the places where said ring is connected to said pins by axial adjustment of the latter; a rod supported for axial movement by said support means and being parallel to the drum axis, said rod engaging said ring; and resilient means operatively connected to said rod for maintaining the same in engagement with said ring so that said rod will be axially shifted during turning of said drum together with said pins, said rod and resilient means forming part of a structure for adjusting a guide for the sheet material whereby said guide will be successively located in a pair of different positions when said pins are successively located in a given position with respect to the drum axis.

12. In a machine for cutting sheet material such as leather and the like, in combination, support means including a stationary shaft; a drum turnably carried by said shaft; a plurality of turning pins parallel to said shaft, fixed to said drum, extending in the same direction therefrom, and being angularly distributed about said shaft; a carrier carried by said support means for reciprocating movement back and forth along a path extending along an axis substantially normal to said shaft; and a pair of engaging means for respectively turning said drum in opposite directions about said shaft, each engaging means being movably carried by said carrier for movement to and from an operative position where said engaging means moves together with said carrier for engaging one of said pins upon movement of said carrier in one direction along said path, for turning said one pin and drum therewith about said shaft when said carrier moves in an opposite direction back along said path, and for locating the next turning pin in a position to be engaged by said engaging means at the next movement of said carrier in said one direction along said path.

13. In a machine for cutting sheet material such as leather and the like, in combination, support means including a stationary shaft; a drum turnably carried by said shaft; a plurality of turning pins parallel to said shaft, fixed to said drum, extending in the same direction therefrom, and being angularly distributed about said shaft; a carrier carried by said support means for reciprocating movement back and forth along a path extending along an axis substantially normal to said shaft; a pair of engaging means for respectively turning said drum in opposite directions about said shaft, each engaging means being movably carried by said carrier for movement to and from an operative position where said engaging means moves together with said carrier for engaging one of said pins upon movement of said carrier in one direction along said path, for turning said one pin and drum therewith about said shaft when said carrier moves in an opposite direction back along said path, and for locating the next turning pin in a position to be engaged by said engaging means at the next movement of said carrier in said one direction along said path; positioning means turnably carried by said carrier and operatively connected to said pair of engaging means for alternately locating the same in said operative positions thereof; and manually operable setting means carried by said support means and engaging said positioning means for turning the same on said carrier to locate one or the other of said engaging means in its operative position.

14. In a machine for cutting sheet material such as leather and the like, in combination, support means including a stationary shaft; a drum turnably carried by said shaft; a plurality of turning pins parallel to said shaft, fixed to said drum, extending in the same direction therefrom, and being angularly distributed about said shaft; a carrier carried by said support means for reciprocating movement back and forth along a path extending along an axis substantially normal to said shaft; a pair of engaging means for respectively turning said drum in opposite directions about said shaft, each engaging means being movably carried by said carrier for movement to and from an operative position where said engaging means moves together with said carrier for engaging one of said pins upon movement of said carrier in one direction along said path, for turning said one pin and drum therewith about said shaft when said carrier moves in an opposite direction back along said path, and for locating the next turning pin in a position to be engaged by said engaging means at the next movement of said carrier in said one direction along said path; first spring means carried by said carrier and operatively connected to said pair of engaging means for moving the same to their operative positions, respectively; second spring means weaker than said first spring means, carried by said carrier, and operatively connected to said pair of engaging means for moving the same out of their operative positions, respectively; moving means turnably carried by said carrier and engaging said first spring means for alternately moving the same to positions freeing said pair of engaging means alternately to the influence of said second spring means to be moved thereby out of said operative positions, respectively; and manually operable setting means carried by said support means and engaging said moving means for turning the same to actuate said first and second spring means for locating one or the other of said engaging means in its operative position.

15. In a machine for cutting sheet material such as leather and the like, in combination, support means including a stationary shaft; a drum turnably carried by said shaft; a plurality of turning pins parallel to said shaft, fixed to said drum, extending in the same direction therefrom, and being angularly distributed about said shaft, one of said pins extending through a greater distance from said drum than the other pin; turning means carried by said support means for reciprocating movement therealong for engaging said turning pins successively to turn said drum on said shaft and having a first position where said turning means engages said pins to turn said drum in one direction and a second position where said turning means engages said pins to turn said drum in an opposite direction; manual setting means turnably carried by said support means and engaging said turning means for setting the same in one or the other of said positions thereof, said setting means also being carried by said support means for movement to and from a position overlapping said one pin; and a pair of extensions fixed to said manual setting means and located in the path of movement of said one pin when said setting means is in said position thereof to be turned alternately in opposite directions by said one pin during turning of the same together with said drum for automatically turning said setting means to reverse repeatedly and automatically the direction of turning of said drum.

16. In a machine for cutting sheet material such as leather and the like, in combination, support means including a stationary shaft; a drum turnably carried by said shaft; a plurality of turning pins parallel to said shaft, fixed to said drum, extending in the same direction therefrom, and being angularly distributed about said shaft, one of said pins extending through a greater distance from said drum than the other pin; turning means carried by said support means for reciprocating movement therealong for engaging said turning pins successively to turn said drum on said shaft and having a first position where said turning means engages said pins to turn said drum in one direction and a second position where said turning means engages said pins to turn said drum in an opposite direction; manual setting means turnably carried by said support means and engaging said turning means for setting the same in one or the other of said positions thereof, said setting means also being carried by said support means for movement to and from a position overlapping said one pin; a pair of extensions fixed to said manual setting means and located in the path of movement of said one pin when said setting means is in said position thereof to be turned alternately in opposite directions by said one pin during turning of the same together with said drum for automatically turning said setting means to reverse repeatedly and automatically the direction of turning of said drum; and spring-pressed detent means carried by said support means and said manual setting means for releasably retaining the latter in or out of said position.

17. In a machine for cutting sheet material such as leather and the like, in combination, support means including a stationary shaft; a drum turnably carried by said shaft; a plurality of turning pins parallel to said shaft, fixed to said drum, extending in the same direction therefrom, and being angularly distributed about said shaft; a carrier carried by said support means for reciprocating movement back and forth along a path extending along an axis substantially normal to said shaft; a pair of engaging means for respectively turning said drum in opposite directions about said shaft, each engaging means being movably carried by said carrier for movement to and from an operative position where said engaging means moves together with said carrier for engaging one of said pins upon movement of said carrier in one direction along said path, for turning said one pin and drum therewith about said shaft when said carrier moves in an opposite direction back along said path, and for locating the next turning pin in a position to be engaged by said engaging means at the next movement of said carrier in said one direction along said path; moving means operatively connected to said carrier for reciprocating the same; and an actuation means accessible to the operator to be operated for actuating said moving means.

18. In a machine for cutting sheet material such as leather and the like, in combination, support means including a stationary shaft; a drum turnably carried by said shaft; a plurality of turning pins parallel to said shaft, fixed to said drum, extending in the same direction therefrom, and being angularly distributed about said shaft; a carrier carried by said support means for reciprocating movement back and forth along a path extending along an axis substantially normal to said shaft; a pair of engaging means for respectively turning said drum in opposite directions about said shaft, each engaging means being movably carried by said carrier for movement to and from an operative position when said engaging means moves together with said carrier for engaging one of said pins upon movement of said carrier in one direction along said path, for turning said one pin and drum therewith about said shaft when said carrier moves in an opposite direction back along said path, and for locating the next turning pin in a position to be engaged by said engaging means at the next movement of said carrier in said one direction along said path; hydraulic moving means operatively connected to said carrier for reciprocating the same; and an actuation means accessible to the operator to be operated for actuating said moving means.

19. In a machine for cutting sheet material such as leather and the like, in combination, support means including a stationary shaft; a drum turnably carried by said shaft; a plurality of turning pins parallel to said shaft, fixed to said drum, extending in the same direction therefrom, and being angularly distributed about said shaft; a carrier carried by said support means for reciprocating movement back and forth along a path extending along an axis substantially normal to said shaft; a pair of engaging means for respectively turning said drum in opposite directions about said shaft, each engaging means being movably carried by said carrier for movement to and from an operative position where said engaging means moves together with said carrier for engaging one of said pins upon movement of said carrier in one direction along said path, for turning said one pin and drum therewith about said shaft when said carrier moves in an opposite direction back along said path, and for locating the next turning pin in a position to be engaged by said engaging means at the next movement of said carrier in said one direction along said path; electrical moving means operatively connected to said carrier for reciprocating the same; and an actuation means accessible to the operator to be operated for actuating said moving means.

References Cited in the file of this patent

UNITED STATES PATENTS

| | | |
|---|---|---|
| 958,124 | Hirth | May 17, 1910 |
| 1,169,060 | Alexander | Jan. 18, 1916 |
| 1,469,849 | Ray | Oct. 9, 1923 |
| 2,687,634 | Beck | Aug. 31, 1954 |